US012775666B2

(12) United States Patent
Huber

(10) Patent No.: US 12,775,666 B2
(45) Date of Patent: *Oct. 27, 2026

(54) SYSTEMS AND METHODS FOR DISPLAYING SEARCH RESULTS

(71) Applicant: Carvana, LLC, Tempe, AZ (US)

(72) Inventor: Zachary Huber, Tempe, AZ (US)

(73) Assignee: Carvana, LLC, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/789,223

(22) Filed: Jul. 30, 2024

(65) Prior Publication Data

US 2024/0386059 A1 Nov. 21, 2024

Related U.S. Application Data

(63) Continuation of application No. 17/515,099, filed on Oct. 29, 2021, now Pat. No. 12,067,057.

(51) Int. Cl.
*G06F 16/903* (2019.01)
*G06F 3/0483* (2013.01)

(52) U.S. Cl.
CPC ...... *G06F 16/90335* (2019.01); *G06F 3/0483* (2013.01)

(58) Field of Classification Search
None
See application file for complete search history.

(56) References Cited

U.S. PATENT DOCUMENTS 9,235,642 B1 * 1/2016 Daniel .................. G06F 16/951
9,367,627 B1 * 6/2016 Banti ................. G06Q 30/0241
9,934,202 B1 * 4/2018 Wang .................... G06F 16/245
10,055,387 B2 8/2018 Shankar
2005/0245241 A1 11/2005 Durand et al.
2009/0144250 A1 * 6/2009 Kapadia ................ G06F 16/951 707/999.009
2011/0066600 A1 3/2011 Cormode et al.
2013/0097197 A1 4/2013 Rincover et al.
2013/0173655 A1 7/2013 Hoots et al.
2013/0246404 A1 9/2013 Annau et al.
(Continued)

FOREIGN PATENT DOCUMENTS

CN 113486253 A * 10/2021 ......... G06F 16/9535
WO 2007145715 A1 12/2007
(Continued)

OTHER PUBLICATIONS

Gao, Qin. "An empirical study of tagging for personal information organization: Performance, workload, memory, and consistency." International Journal of Human-Computer Interaction 27, No. 9 (2011): 821-863. (Year: 2011).*
(Continued)

*Primary Examiner* — Uyen T Le

(74) *Attorney, Agent, or Firm* — SNELL & WILMER L.L.P.

(57) ABSTRACT

Systems, methods, and articles of manufacture for displaying search results on a webpage are disclosed. The search results can be arranged on the webpage using a skip number or a take number. The skip number and take number can determine how many results with a tag are displayed on the webpage.

20 Claims, 7 Drawing Sheets

(56) References Cited

U.S. PATENT DOCUMENTS

| | | | | |
|---|---|---|---|---|
| 2014/0218383 | A1* | 8/2014 | Srivastava | G06T 11/26 345/589 |
| 2014/0270571 | A1 | 9/2014 | Dwan et al. | |
| 2014/0280047 | A1 | 9/2014 | Shukla et al. | |
| 2014/0280522 | A1 | 9/2014 | Watte | |
| 2016/0224518 | A1* | 8/2016 | Shankar | G06F 40/114 |
| 2017/0132323 | A1 | 5/2017 | Kuralenok | |
| 2018/0217820 | A1 | 8/2018 | Conley et al. | |
| 2020/0159756 | A1* | 5/2020 | Norton, III | G06F 3/0482 |

FOREIGN PATENT DOCUMENTS

| | | | | |
|---|---|---|---|---|
| WO | 2015035069 | A1 | 3/2015 | |
| WO | WO-2015170151 | A1 * | 11/2015 | G06F 16/90328 |

OTHER PUBLICATIONS

Ikeda, Sohei, Takakazu Nagamine, and Tomio Kamada. "Application framework with demand-driven mash up for selective browsing." In Proceedings of the 10th international Conference on information integration and Web-Based Applications & Services, pp. 33-40. 2008. (Year: 2008).

Moore et al."Subj3ct—A Subject Identity Resolution Service" Linked Topic Map (2009) pp. 175-184, (Year: 2009).

Li, Chaoshun, Hongshun Li, and Pangao Kou. "Piecewise function based gravitational search algorithm and its application on parameter identification of AVR system." Neurocomputing 124 (2014): 139-148. (Year: 2014).

Li, Dongsheng S., et al. "Efficient range query processing in peer-to-peer systems." IEEE transactions on Knowledge and data engineering 21.1 (2008): 78-91. (Year: 2008).

* cited by examiner

SYSTEMS AND METHODS FOR DISPLAYING SEARCH RESULTS

CROSS-REFERENCE TO RELATED APPLICATIONS

This application is a continuation of, and claims priority to, U.S. application Ser. No. 17/515,099, filed Oct. 29, 2021 and entitled "Systems And Methods For Displaying Search Results," which is herein incorporated by this reference in its entirety for all purposes.

TECHNICAL FIELD

This disclosure relates generally to search engines and relates more particularly to search algorithms and resulting graphical user interfaces generated by these algorithms.

BACKGROUND

Search engines are integral to the operation of modern computer systems, especially systems handling large corpuses of data. While ample consideration has been paid to systems for identifying results using a search algorithm, pagination of results (e.g., the act of dividing the results into multiple pages to be displayed to users of the systems) has received less attention. Many prior art search engines simply paginate by displaying results in an order according to one or more ordering rules (e.g., most popular first, closest first, highest relevancy score first, etc.) and then moving to the next results page when a maximum number of results are reached on the current results page.

In view of the above, there is a need for a system and method for displaying search results using a novel pagination algorithm.

BRIEF DESCRIPTION OF THE DRAWINGS

To facilitate further description of the embodiments, the following drawings are provided in which.

Figure 1:
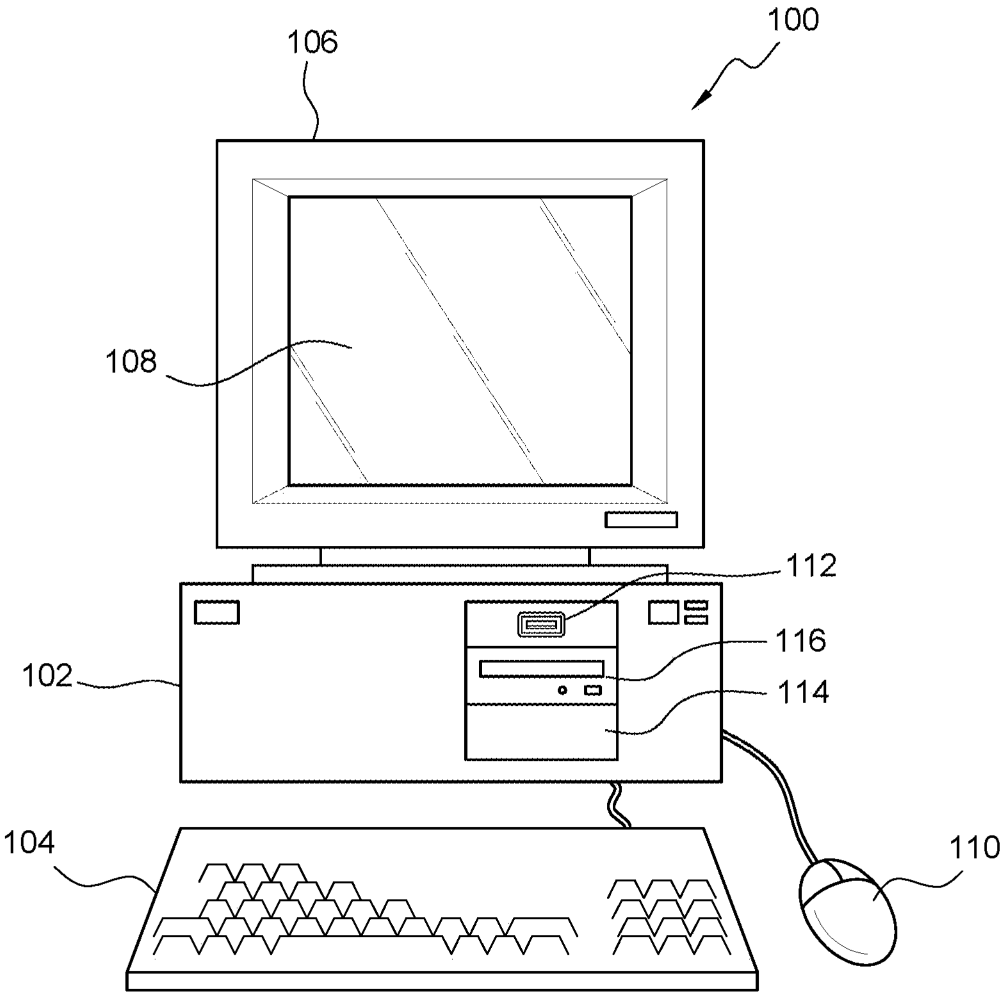
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can comprise one or more processors and one or more non-transitory computer-readable storage devices. The one or more non-transitory computer-readable storage devices can store computing instructions configured to run on the one or more processors and cause the one or more processors to perform operations. The operations can further comprise determining, using the one or more processors, an aggregate count of results for a search query submitted by a user; dividing, using the one or more processors, the aggregate count into a first number of the results with a first tag and a second number of the results with a second tag, wherein the first tag is different from the second tag, and wherein the first tag and the second tag are hidden from the user in response to the results being displayed on a search results page in a sequence of search result pages; generating, using the one or more processors, a skip number for a first search results page of the sequence of search result pages, wherein the skip number indicates a number of results of the aggregate count with the second tag omitted from a first search result page of the sequence of search result pages; generating, using the one or more processors and the skip number, a take number for the first search results page of the sequence of search result pages; coordinating, using the one or more processors, a search of a database of records using the skip number and the take number; and coordinating displaying, using the one or more processors, the first search results page of the sequence of search result pages to the user, wherein the first search results page shows the take number of the results with the second tag.

Some embodiments can include a method. The method can comprise determining, using one or more processors, an aggregate count of results for a search query submitted by a user; dividing, using the one or more processors, the aggregate count into a first number of the results with a first tag and a second number of the results with a second tag, wherein the first tag is different from the second tag, and wherein the first tag and the second tag are hidden from the user in response to the results being displayed on a search results page in a sequence of search result pages; generating, using the one or more processors, a skip number for a first search results page of the sequence of search result pages, wherein the skip number indicates a number of results of the aggregate count with the second tag omitted from a first search result page of the sequence of search result pages; generating, using the one or more processors and the skip number, a take number for the first search results page of the sequence of search result pages; coordinating, using the one or more processors, a search of a database of records using the skip number and the take number; and coordinating displaying, using the one or more processors, the first search results page of the sequence of search result pages to the user, wherein the first search results page shows the take number of the results with the second tag.

Various embodiments can include one or more articles of manufacture. The one or more articles of manufacture can include one or more non-transitory, tangible computer readable storage mediums. The one or more non-transitory, tangible computer readable storage mediums can have instructions stored thereon that, in response to execution by one or more processors, cause the one or more processors to perform operations. The operations can further comprise determining, using the one or more processors, an aggregate count of results for a search query submitted by a user; dividing, using the one or more processors, the aggregate count into a first number of the results with a first tag and a second number of the results with a second tag, wherein the first tag is different from the second tag, and wherein the first tag and the second tag are hidden from the user in response to the results being displayed on a search results page in a sequence of search result pages; generating, using the one or more processors, a skip number for a first search results page of the sequence of search result pages, wherein the skip number indicates a number of results of the aggregate count with the second tag omitted from a first search result page of the sequence of search result pages; generating, using the one or more processors and the skip number, a take number for the first search results page of the sequence of search result pages; coordinating, using the one or more processors, a search of a database of records using the skip number and the take number; and coordinating displaying, using the one or more processors, the first search results page of the sequence of search result pages to the user, wherein the first search results page shows the take number of the results with the second tag.

A number of embodiments can include a system. The system can include one or more processors and one or more non-transitory computer-readable storage devices storing computing instructions. The computing instructions can be configured to run on the one or more processors and perform receiving a search request from an electronic device of a user; determining a first number of one or more first results for the search request and a second number of one or more second results for the search request; generating a pagination query using the first number of the one or more first results and the second number of the one or more second results; coordinating a search of one or more databases of records using the pagination query; and coordinating displaying one or more search result pages based on the search of the one or more databases of records, the one or more search result pages comprising at least one of the one or more first results and at least one of the one or more second results.

Various embodiments include a method. The method can be implemented via execution of computing instructions configured to run at one or more processors and configured to be stored at non-transitory computer-readable media. The method can comprise receiving a search request from an electronic device of a user; determining a first number of one or more first results for the search request and a second number of one or more second results for the search request; generating a pagination query using the first number of the one or more first results and the second number of the one or more second results; coordinating a search of one or more databases of records using the pagination query; and coordinating displaying one or more search result pages based on the search of the one or more databases of records, the one or more search result pages comprising at least one of the one or more first results and at least one of the one or more second results.

Figure 2:
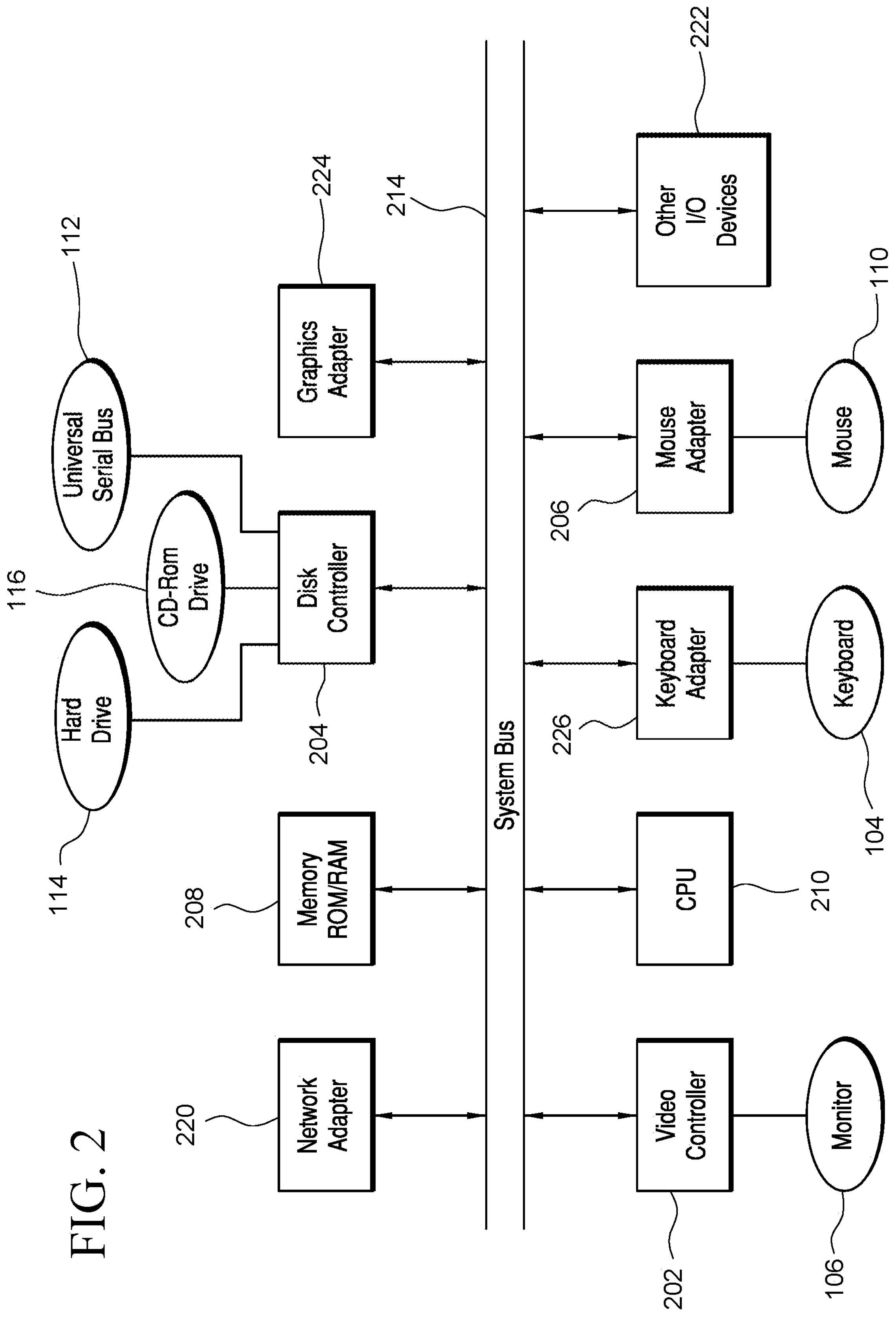
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
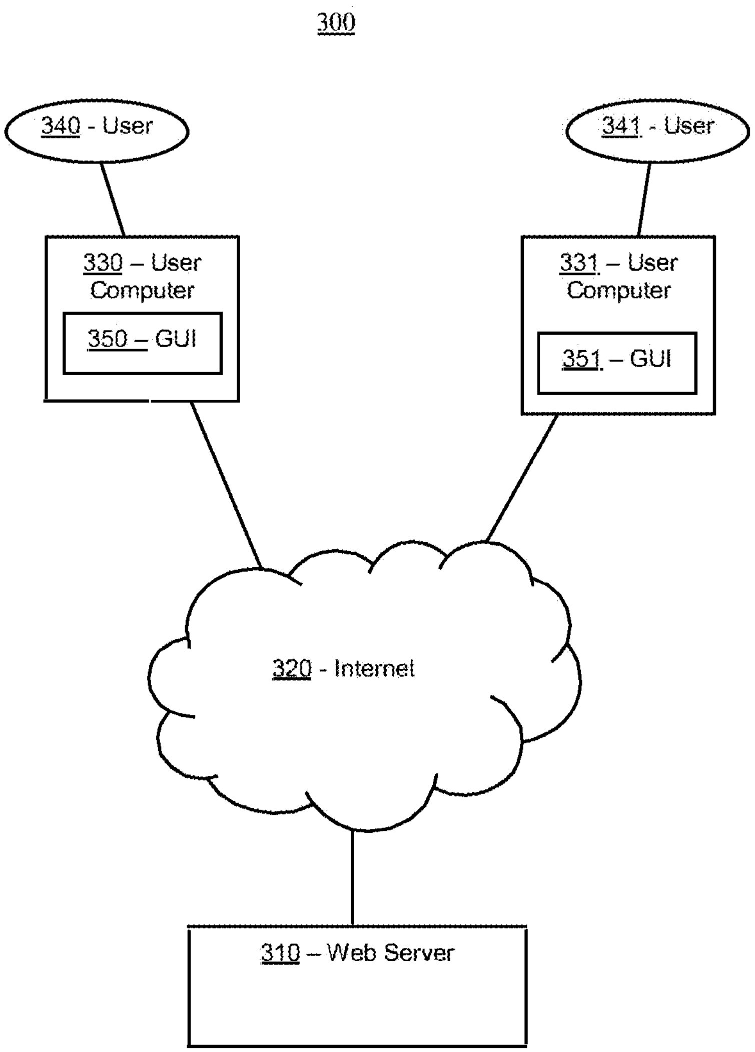
FIG. 3 illustrates a representative block diagram of a system, according to an embodiment.

Turning ahead in the drawings, FIG. 3 illustrates a block diagram of a system 300 that can be employed for displaying search results, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310, and/or user computers 330, 331. Web server 310 and/or user computers 330, 331 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310 and/or user computers 330, 331. Additional details regarding web server 310 and/or user computers 330, 331 are described herein.

In some embodiments, user computers 330, 331 are external to system 300. User computers 330, 331 can comprise any of the elements described in relation to computer system 100. In some embodiments, user computers 330, 331 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons. In various embodiments, user computers 330, 331 can comprise a display that is smaller than monitor 106 (FIG. 1), thereby facilitating mobility.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise graphical user interface ("GUI") 350, 351. In the same or different embodiments, GUI 350, 351 can be part of and/or displayed by user computers 330, 331, which also can be part of system 300. In some embodiments, GUI 350, 351 can comprise text and/or graphics (image) based user interfaces. In the same or different embodiments, GUI 350, 351 can comprise a heads up display ("HUD"). When GUI 350, 351 comprises a HUD, GUI 350, 351 can be projected onto a medium (e.g., glass, plastic, etc.), displayed in midair as a hologram, or displayed on a display (e.g., monitor 106 (FIG. 1)). In various embodiments, GUI 350, 351 can be color, black and white, and/or greyscale. In many embodiments, GUI 350, 351 can comprise an application running on a computer system, such as computer system 100 (FIG. 1) and/or user computers 350, 351. In the same or different embodiments, GUI 350, 351 can comprise a website accessed through internet 320. In some embodiments, GUI 350, 351 can comprise an eCommerce website. In these or other embodiments, GUI 350, 351 can comprise an administrative (e.g., back end) GUI allowing an administrator to modify and/or change one or more settings in system 300. In the same or different embodiments, GUI 350, 351 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, web server 310 can be in data communication through Internet 320 with user computers 350, 351. In certain embodiments, user computers 350, 351 can be desktop computers, laptop computers, smart phones, tablet devices, and/or other endpoint devices. Web server 310 can host one or more websites. For example, web server 310 can host an eCommerce website that allows users to browse and/or search for products, to add products to an electronic shopping cart, and/or to purchase products, in addition to other suitable activities.

In many embodiments, web server 310 and/or user computers 330, 331 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of web server 310 and/or user computers 330, 331 in a wired manner and/or a wireless manner, and the coupling can be direct and/or indirect, as well as locally and/or remotely. As an example of an indirect manner (which may or may not also be a remote manner), a keyboard-video-mouse (KYM) switch can be used to couple the input device(s) and the display device(s) to the processing module(s) and/or the memory storage module(s). In some embodiments, the KYM switch also can be part of web server 310 and/or user computers 330, 331. In a similar manner, the processing module(s) and the memory storage module(s) can be local and/or remote to each other.

In many embodiments, web server 310 and/or user computers 330, 331 can be configured to communicate with each other. In some embodiments, user computers 330, 331 also can be referred to as customer computers. In some embodiments, web server 310 and/or user computers 330, 331 can communicate or interface (e.g., interact) with one or more customer computers (such as user computers 330 and 331) through a network or internet 320. Internet 320 can be an intranet that is not open to the public. In further embodiments, Internet 320 can be a mesh network of individual systems. Accordingly, in many embodiments, web server 310 (and/or the software used by such systems) can refer to a back end of system 300 operated by an operator and/or administrator of system 300 and user computers 330, 331 (and/or the software used by such systems) can refer to a front end of system 300 used by one or more users 340, 341, respectively. In some embodiments, users 340, 341 can also be referred to as customers, in which case, user computers 330, 331 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310 and/or user computers 330, 331 also can be configured to communicate with one or more databases. The one or more databases can comprise a product database that contains information about products, items, SKUs (stock keeping units), models, makes, body style, etc. sold by a retailer. In some embodiments, data can be deleted from a database when it becomes older than a maximum age. In many embodiments, a maximum age can be determined by an administrator of system 300. In various embodiments, data collected in real-time can be streamed to a database for storage.

In many embodiments, one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

In various embodiments, databases can be stored in a cache (e.g., MegaCache) for immediate retrieval on-demand.

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database. In some embodiments, one or more databases can store one or more item records comprising information about the one or more items. In these or other embodiments, one or more information about one or more items can be stored in one or more databases as one or more tags, features, qualities, or classifications of an item. For example, each item record can have its own row in a database while each column in the database is a feature of the item. Each entry in the database could then indicate whether the feature is present for the item and/or which specific sub-category of feature is present for the item.

Meanwhile, communication between web server 310, user computers 330, 331, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for higher quality search results. These techniques described herein can provide a significant improvement over conventional approaches of providing higher quality search results, such as predictive algorithms, by avoiding myopic pagination algorithms that focus on only one feature.

In a number of embodiments, the techniques described herein can solve a technical problem that arises only within the realm of computer networks, as search result pagination does not exist outside the realm of computer networks.

Prior art pagination methods can result in number of problems. For example, search engines that order results by most relevant or most popular risk becoming myopic and overly reliant on the underlying search algorithm. This result, then, can lead to imperfections in the algorithm (e.g., overpredicting or underpredicting) influencing pagination and, therefore, user choice. This problem can be magnified in systems that use machine learning algorithms for search as user interactions with the results can create a feedback loop where a few features dominate the first page of the results. Other problems can arise in a search engine that draws results from two sources. For example, a first source of results can be continually paginated before a second source of results due to the default ordering rules. If this first source crowds out the second source on one or more search results pages, then users of the search engine may think that it is modifying pagination to benefit the first source over the second source. Further, if the first source contains results of lower quality than the second source, then the users may think that the search engine is inaccurate or of low quality.

Figure 4:
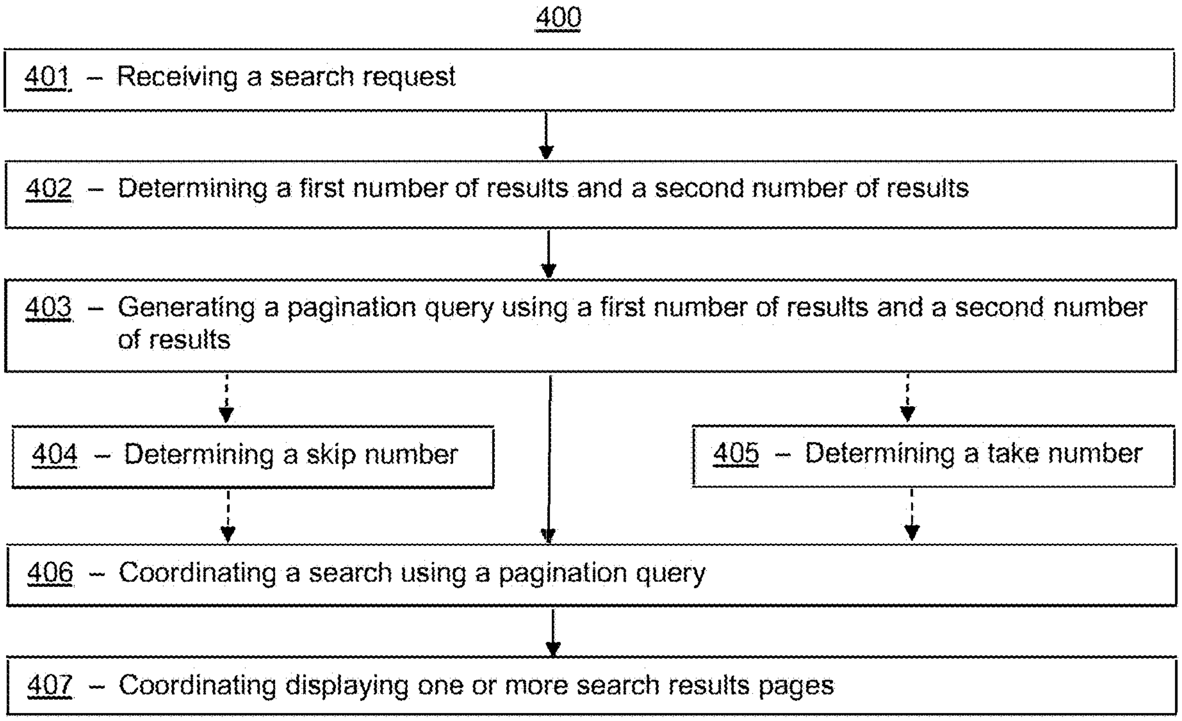
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310 and/or user computers 330, 331 (FIG. 3). The processing module(s) can be similar or identical to the processing module(s) described above with respect to computer system 100 (FIG. 1).

In many embodiments, method 400 can comprise an activity 401 of receiving a search request. In various embodiments, a search request can be received from a user computer (e.g., one or more of user computers 330, 331 (FIG. 3)). In some embodiments, a search request can be received through a website viewed on a user computer and/or an application installed on a user computer. In various embodiments, a search request can comprise a search query. For example, a search query can be a natural language search query, a structured search query, an image search query, etc. In many embodiments, a search request can be entered into a search request bar and submitted to a web server (e.g., web server 310 (FIG. 3)). In some embodiments, a search request can comprise selection features and/or filters for desired search results (e.g., a selection of a make, model, price range, etc.) on a GUI (e.g., GUI 350, 351 (FIG. 3)).

In many embodiments, method 400 can comprise an activity 402 of determining a first number of results and a second number of results. Generally speaking, a first number of results can be identified and/or tagged differently than a second number of results. A first number of results can be different from a second number of results in various ways. For example, a first number of results can be from an operator of the system while a second number of results can be from one or more third-party entities. As another example, a first number of results can lack a specific feature while a second number of results can have the specific feature. In some embodiments, both a first number of results and a second number of results satisfy one or more conditions of a search request. For example, if a search request asks for red automobiles with a fuel economy of at least 20 miles per gallon (mpg), then a first number of results can comprise red Toyotas with at least 20 mpg and a second number of results can comprise red Ford's with at least 20 mpg. In various embodiments, a number of results can be determined using one or more search algorithms known in the art or heretofore created. For example, a predictive (e.g., machine learning) search algorithm, a sequential search algorithm (e.g., a linear search), and/or an interval search algorithm (e.g., a binary search) can all be used in whole or in part to determine a first number of results. In various embodiments, a first number of results and/or a second number of results can be determined using one or more features, qualities, and/or tags associated with a record stored in a database. For example, a search request can return a total number of results (e.g., an aggregate count) in the form of records from a database. This total number of results can then be divided into a first number of results and a second number of results using a feature stored in the database. In many embodiments, a feature identifying a first number of results from a second number of results can be selected by an administrator of system 300 (FIG. 3). In various embodiments, a feature identifying a first number of results from a second number of results can be a hidden feature not shown to or accessible by a user. For example, a hidden feature could comprise a source of an item (in-house vs. third-party) when the source is not disclosed to the user.

In many embodiments, method 400 can comprise an activity 403 of generating a pagination query using a first number of results and a second number of results. Generally speaking, a pagination query can be similar to a search query in that it queries a database, but, instead of returning a total number of results, a pagination query returns a number and composition of results for a specific page. For example, a pagination query can return a maximum number or results displayable on a specific page while at the same time returning a specified number different types of results (e.g., a first number of results and a second number of results). In this way, a pagination query can intermix and/or sprinkle a second type of results among a first type of results in a way that is not overwhelming for the user or over reliant on an underlying search algorithm.

In some embodiments, method 400 can optionally comprise activity 404 of determining a skip number. In many embodiments, activity 404 can be performed as a part of and/or at the same time as one or more of activities 403 and/or 405. In other embodiments, activity 404 can be performed before or after activity 405. In these or other embodiments, a skip number can comprise a skipped number of results of a category of results (e.g. a first number of results or a second number of results) on a specific page. In other words, a skipped number can comprise a number of undisplayed results for a results page and/or a number of withheld results (e.g., a quantity of results from the first number of results are skipped over and not displayed, before displaying the next result from the first number of results; the same can be done for the second number of results). In some embodiments, a skip number can be used to determine which portion of a number of results (e.g., a total number of results and/or a second number of results) to display. For example, in a set of 100 results, if a skip is 0, and a take is 20, then a results panel would display results 0-19 of the set of results. If a skip in the set of 100 results is 25 and the take is 20, then a results panel would display results 25-44.

In many embodiments, one or more skip numbers can be calculated and/or set as a default for a specific page. For example, a skip number can be set at zero for the first number of results on a first page (or on a predefined number of pages, or all pages) and all vehicles for the first number of results can be shown on the first page (or on the predefined number of pages, or all pages), and in this same example the skip number can be the same or different for the second number of results on the first page (or on the predefined number of pages, or all pages). In embodiments where the skip number is zero, no skip number can be determined. In other embodiments, a skip number can be set for only one of the first or second number of results. As another example, an administrator of system 300 (FIG. 3) can set skip number(s) for a specific page. In these or other embodiments, a category of vehicles (e.g., four-door sedans) can be not shown on a specific page(s), or fewer results from that category of vehicles can be shown on the specific page(s). In various embodiments, a skip number can be determined using a piecewise function. In these embodiments, a function used in the piecewise function can differ depending on what is shown on one or more preceding pages.

In many embodiments, a function used to determine a skip number in a piecewise function can depend on whether results in a category of results were displayed on a first results page. When results in the category were displayed on the first page, the following equation can be used to determine a skip number:

$$\text{Skip} = \left(\text{max \# of results per page} - \frac{\text{\# of category results}}{\text{Page \#}}\right) \quad (\text{Page \#} - 1)$$

When results in the category were not displayed on the first results page, the following equation can be used to determine a skip number:

$$\text{Skip} = \text{max \# of results per page} + (\text{max \# of results per page} - (\text{\# of category results})/(\text{Page \#}) \quad (\text{Page \#} - 2)$$

When all of the results in the category have been displayed, the following equation can be used to determine a skip number:

$$\text{Skip} = (\text{max \# of results per page (Page \#} - 1)) - (\text{Page \#}-1)\left(\frac{\text{\# of category results}}{\text{Page \#}}\right)$$

In various embodiments, a max number of results per page can comprise a page size limit. In further embodiments, a number of category results can comprise a total number of results in a category (e.g., a second number of results). In many embodiments, a page number can comprise a number for a results page (e.g., a first page of results would have a page number of one, a second page would have a page number of two, etc.).

In some embodiments, method 400 can optionally comprise activity 405 of determining a take number. In many embodiments, activity 405 can be performed as a part of and/or at the same time as one or more of activities 403 and/or 404. In other embodiments, activity 405 can be performed before or after activity 404. In various embodiments, a take number can comprise a number of displayed results of a category of results on a specific page. In some embodiments, a take number can be set to a default number of results (e.g., a take number can be set to zero when no category results are to be displayed on a first page (or on a predefined number of pages, or all pages), or a take number can be set to 4 when a minimum (or maximum) of four category results are to be displayed on the first page (or on the predefined number of pages, or all pages). In these or other embodiments, a take number for a first number of results can be determined by subtracting a take number for a second number of results from a maximum number of results per page. For example, if a take number for a second number of results is 4 and a maximum page size is 20, then a take number for a first number of results can be 16. In embodiments where a take number exceeds a number of remaining results for a category, the take number can be set as the number of remaining results, if any, and any additional, unfilled result slots on a results page can remain unfilled. In still further embodiments, the roles of the first number of results and the second number of results are reversed when determining the take number.

In many embodiments, method 400 can comprise an activity 406 of coordinating a search using a pagination query. In many embodiments, activity 406 can be performed in response to and/or after one or more of activities 403-405. In these or other embodiments, a pagination query can comprise one or more of a take number and a skip number for each of one or more categories of results (e.g., a first number of results and a second number of results). In various embodiments, a search can be coordinated by displaying a number of results equal to a take number for each category.

Figure 6:
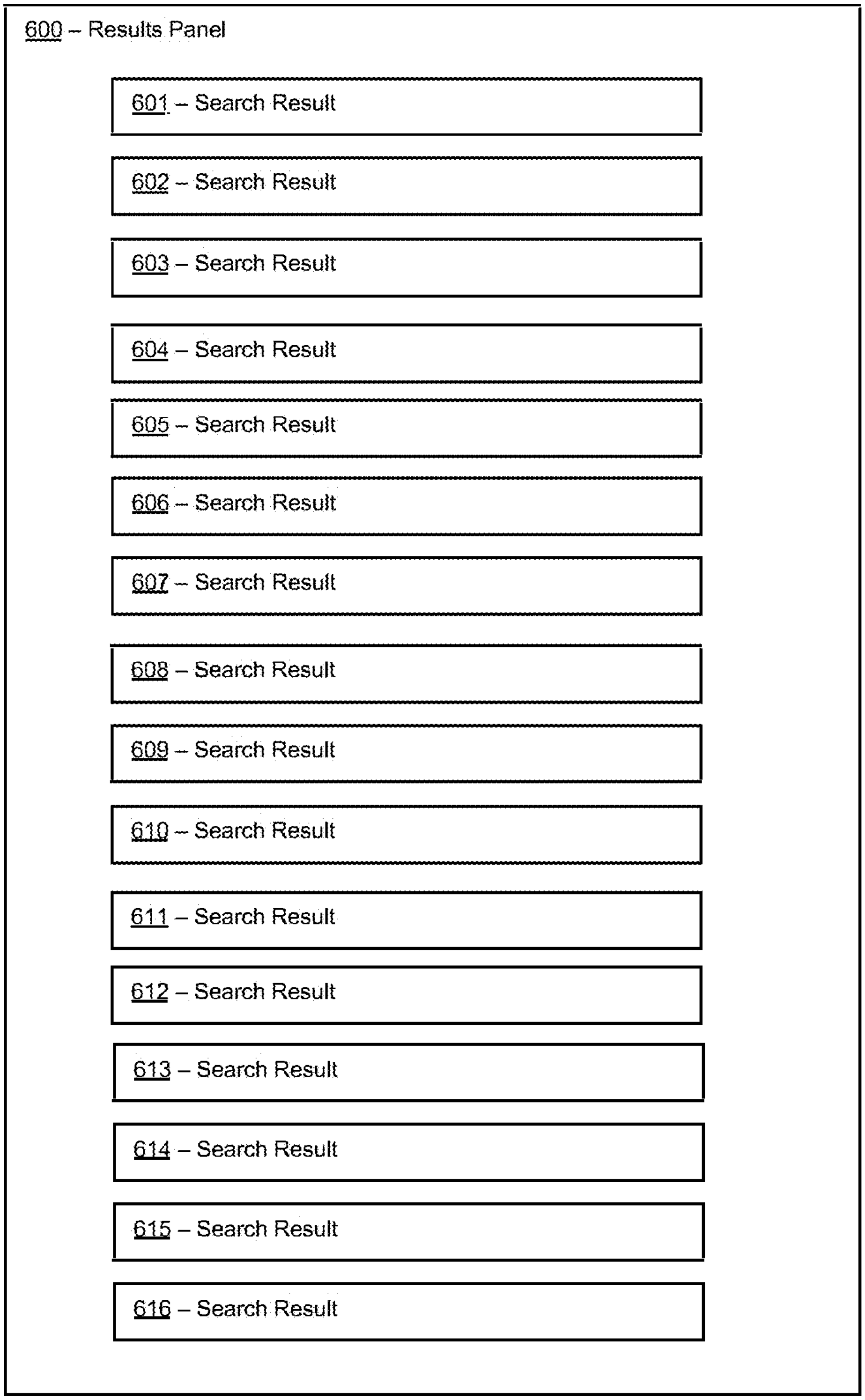
FIGS. 6-7 illustrate representative block diagrams of user interfaces, according to various embodiments.
Figure 7:
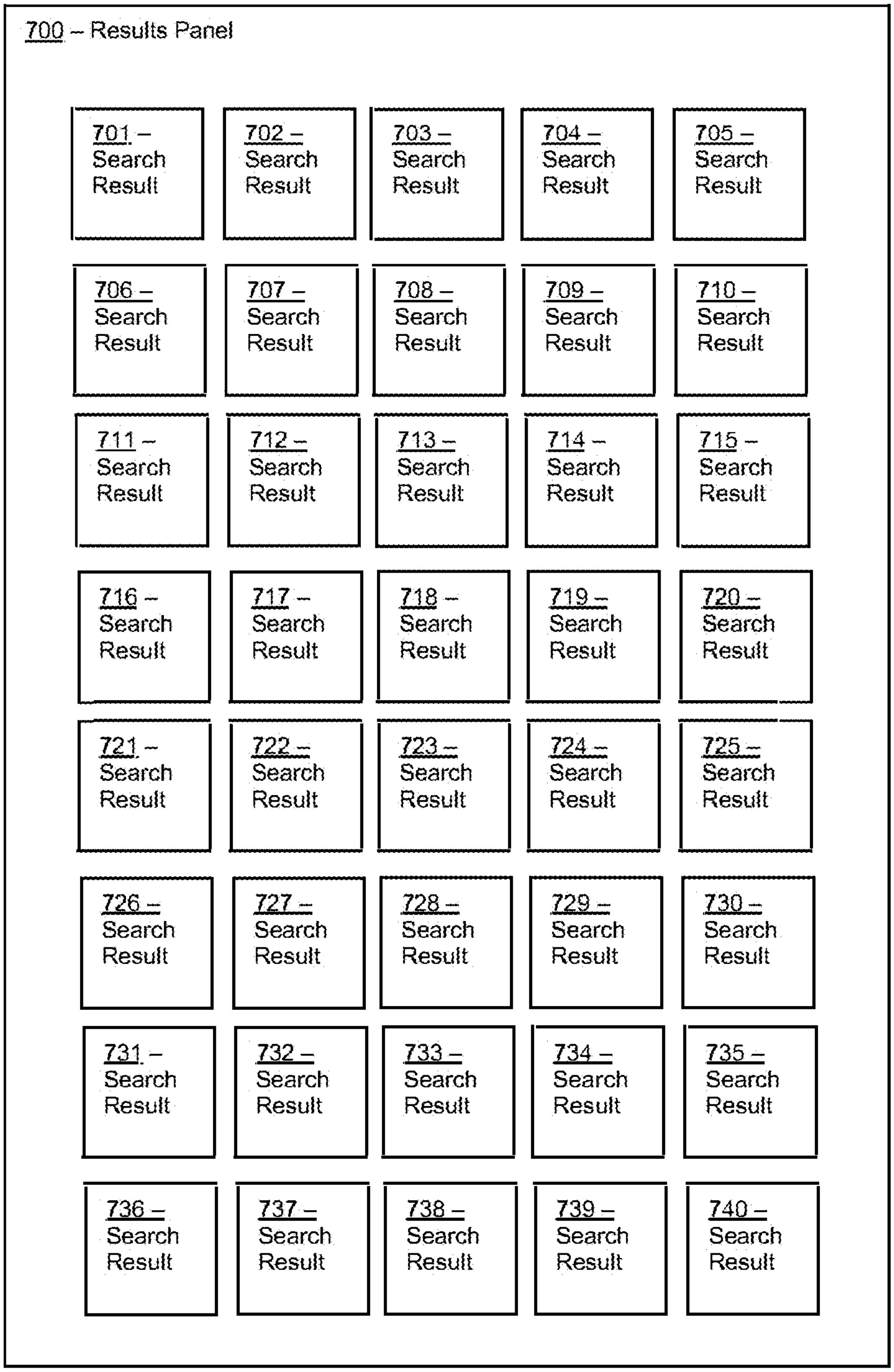

In many embodiments, method 400 can comprise an activity 407 of coordinating displaying one or more search results pages. In some embodiments, a search results page can be structured in a list configuration. FIG. 6 shows an exemplary list results panel 600 comprising search results 601-616. In various embodiments, a search results page can be structured in a grid configuration. FIG. 7 shows an exemplary grid results panel 700 comprising search results 701-740. Returning now to FIG. 4, in many embodiments, activity 407 can comprise randomly distributing a take number of a category of results on a results page. For example, one or more search results can be randomly distributed on results page 600 (FIG. 6) and/or results page 700 (FIG. 7). In other embodiments, the distribution can be based on various rules, which can be based on one or more of a user account number, a cookie ID for a user, and/or a page ID number for a results page. In these or other embodiments, two results from the same category of results cannot be adjacent to each other. For example, if search results 606 (FIG. 6) and 607 (FIG. 6) are both from a second number of results, then one or more items displayed in search results 606 (FIG. 6) and/or 607 (FIG. 6) can be moved to or swapped with another search result in a first number of results, or vice versa. As another example, if search results 713 (FIG. 7) is from a second number of results, then one or more items displayed in search results 707-709, 712, 714, and/or 717-719 (FIG. 7) cannot also be from a second number of results, or vice versa. As a further example, search result 601 (FIG. 6) and search result 701 (FIG. 7) (and/or one or more other search results in FIGS. 6 and 7) can always be from the first number of results and not from the second number of results, or vice versa.

Figure 5:
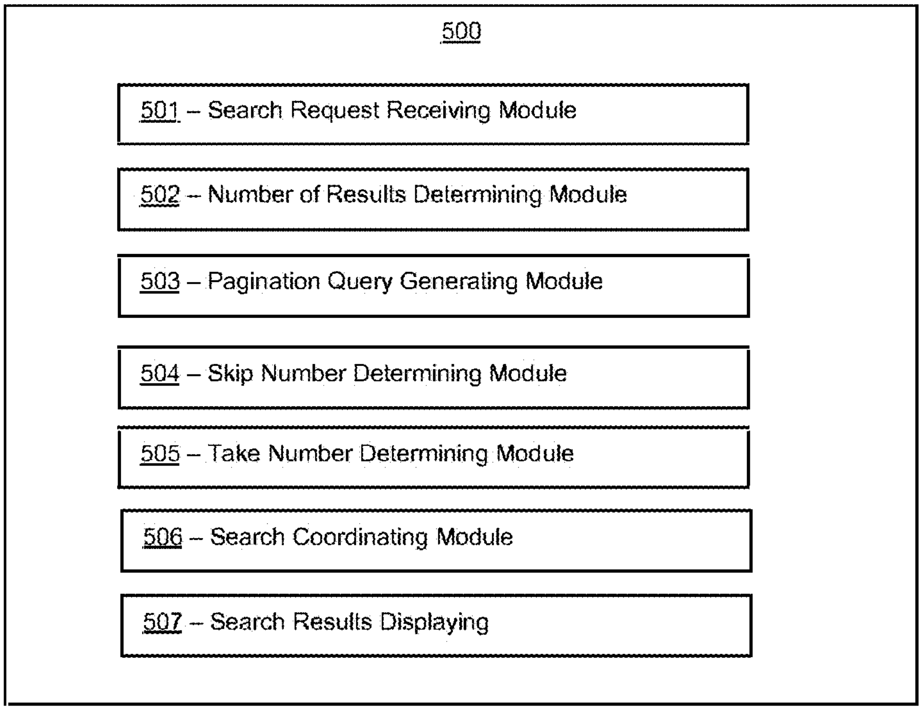
FIG. 5 illustrates a representative block diagram of a system, according to an additional embodiment.

Turning ahead in the drawings, FIG. 5 illustrates a block diagram of a system 500 that can be employed for behavior based messaging. System 500 is merely exemplary and embodiments of the system are not limited to the embodiments presented herein. System 500 can be employed in many different embodiments or examples not specifically depicted or described herein. In some embodiments, certain elements or modules of system 500 can perform various procedures, processes, and/or activities. In these or other embodiments, the procedures, processes, and/or activities can be performed by other suitable elements or modules of system 500.

Generally, therefore, system 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein.

In many embodiments, system 500 can comprise non-transitory memory storage module 501. Memory storage module 501 can be referred to as search request receiving module 501. In many embodiments, search request receiving module 501 can store computing instructions configured to run on one or more processing modules and perform one or more acts of method 400 (FIG. 4) (e.g., activity 401 (FIG. 4)).

In many embodiments, system 500 can comprise non-transitory memory storage module 502. Memory storage module 502 can be referred to as number of results determining module 502. In many embodiments, number of results determining module 502 can store computing instructions configured to run on one or more processing modules and perform one or more acts of method 400 (FIG. 4) (e.g., activity 402 (FIG. 4)).

In many embodiments, system 500 can comprise non-transitory memory storage module 503. Memory storage module 503 can be referred to as pagination query generating module 503. In many embodiments, pagination query generating module 503 can store computing instructions configured to run on one or more processing modules and perform one or more acts of method 400 (FIG. 4) (e.g., activity 403 (FIG. 4)).

In many embodiments, system 500 can comprise non-transitory memory storage module 504. Memory storage module 504 can be referred to as skip number determining module 504. In many embodiments, skip number determining module 504 can store computing instructions configured to run on one or more processing modules and perform one or more acts of method 400 (FIG. 4) (e.g., activity 404 (FIG. 4)).

In many embodiments, system 500 can comprise non-transitory memory storage module 505. Memory storage module 505 can be referred to as take number determining module 505. In many embodiments, take number determining module 505 can store computing instructions configured to run on one or more processing modules and perform one or more acts of method 400 (FIG. 4) (e.g., activity 405 (FIG. 4)).

In many embodiments, system 500 can comprise non-transitory memory storage module 506. Memory storage module 506 can be referred to as search coordinating module 506. In many embodiments, search coordinating module 506 can store computing instructions configured to run on one or more processing modules and perform one or more acts of method 400 (FIG. 4) (e.g., activity 406 (FIG. 4)).

In many embodiments, system 500 can comprise non-transitory memory storage module 507. Memory storage module 507 can be referred to as search results displaying module 507. In many embodiments, search results displaying module 507 can store computing instructions configured to run on one or more processing modules and perform one or more acts of method 400 (FIG. 4) (e.g., activity 407 (FIG. 4)).

Although systems and methods for displaying search results have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

one or more processors; and one or more non-transitory computer-readable storage devices storing computing instructions configured to run on the one or more processors and cause the one or more processors to perform operations comprising:

determining, using the one or more processors, an aggregate count of results for a search query submitted by a user;

dividing, using the one or more processors, the aggregate count into a first number of the results with a first tag and a second number of the results with a second tag, wherein the first tag and the second tag comprise entries in a database indicating a feature, quality, or classification of the results, wherein the first tag is different from the second tag, and wherein the first tag and the second tag are hidden from the user in response to at least a portion of the results being displayed on a search results page in a sequence of search result pages;

generating, using the one or more processors, a skip number for a first search results page of the sequence of search result pages, wherein the skip number indicates a number of the aggregate count of the results with the second tag omitted from a first search result page of the sequence of search result pages;

generating, using the one or more processors and the skip number, a take number for the first search results page of the sequence of search result pages;

coordinating, using the one or more processors, a search of a database of records using the skip number and the take number; and coordinating displaying, using the one or more processors, the first search results page of the sequence of search result pages to the user, wherein the first search results page shows the take number of the results with the second tag.

2. The system of claim 1, wherein the results with the second tag are not in an initial position on the first search results page.

3. The system of claim 1, wherein the results with the second tag are not immediately above each other, not immediately below each other, not immediately to a left of each other, or not immediately to a right of each other.

4. The system of claim 1, wherein the skip number is determined using a piecewise function.

5. The system of claim 4, wherein the piecewise function depends on whether the first search results page of the sequence of search results pages included one or more results of the results with the first tag.

6. The system of claim 1, wherein the second tag identifies third-party results.

7. The system of claim 1, wherein the results with the second tag are randomly distributed in a grid pattern on the first search results page of the sequence of search result pages.

8. A method comprising:

determining, using one or more processors, an aggregate count of results for a search query submitted by a user;

dividing, using the one or more processors, the aggregate count into a first number of the results with a first tag and a second number of results with a second tag, wherein the first tag and the second tag comprise entries stored in one or more databases indicating a feature, quality, or classification of the results for the search query submitted by the user, wherein the first tag is different from the second tag, and wherein the first tag and the second tag are hidden from the user in response to at least a portion of the results being displayed on a search results page in a sequence of search result pages;

generating, using the one or more processors, a skip number for a first search results page of the sequence of search result pages, wherein the skip number indicates a number of the aggregate count of the results with the second tag omitted from a first search result page of the sequence of search result pages;

generating, using the one or more processors and the skip number, a take number for the first search results page of the sequence of search result pages;

coordinating, using the one or more processors, a search of a database of records using the skip number and the take number; and coordinating displaying, using the one or more processors, the first search results page of the sequence of search result pages to the user, wherein the first search results page shows the take number of the results with the second tag.

9. The method of claim 8, wherein the results with the second tag are not in an initial position on the first search results page.

10. The method of claim 8, wherein the results with the second tag are not immediately above each other, not immediately below each other, not immediately to a left of each other, or not immediately to a right of each other.

11. The method of claim 8, wherein the skip number is determined using a piecewise function.

12. The method of claim 11, wherein the piecewise function depends on whether the first search results page of the sequence of search results pages included one or more results of the results with the first tag.

13. The method of claim 8, wherein the second tag identifies third-party results.

14. The method of claim 8, wherein the results with the second tag are randomly distributed in a grid pattern on the first search results page of the sequence of search result pages.

15. One or more articles of manufacture including one or more non-transitory, tangible computer readable storage mediums having instructions stored thereon that, in response to execution by one or more processors, cause the one or more processors to perform operations comprising:

determining, using the one or more processors, an aggregate count of results for a search query submitted by a user;

dividing, using the one or more processors, the aggregate count into a first number of the results with a first tag and a second number of results with a second tag, wherein the first tag and the second tag comprise entries in one or more databases indicating a feature, quality, or classification of the results for the search query submitted by the user, wherein the first tag is different from the second tag, and wherein the first tag and the second tag are hidden from the user in response to at least a portion of the results being displayed on a search results page in a sequence of search result pages;

generating, using the one or more processors, a skip number for a first search results page of the sequence of search result pages, wherein the skip number indicates a number of the aggregate count of the results with the second tag omitted from a first search result page of the sequence of search result pages;

generating, using the one or more processors and the skip number, a take number for the first search results page of the sequence of search result pages;

coordinating, using the one or more processors, a search of a database of records using the skip number and the take number; and coordinating displaying, using the one or more processors, the first search results page of the sequence of search result pages to the user, wherein the first search results page shows the take number of the results with the second tag.

16. The one or more articles of manufacture of claim 15, wherein the results with the second tag are not in an initial position on the first search results page.

17. The one or more articles of manufacture of claim 15, wherein the results with the second tag are not immediately above each other, not immediately below each other, not immediately to a left of each other, or not immediately to a right of each other.

18. The one or more articles of manufacture of claim 15, wherein the skip number is determined using a piecewise function.

19. The one or more articles of manufacture of claim 18, wherein the piecewise function depends on whether the first search results page of the sequence of search results pages included one or more results of the results with the first tag.

20. The one or more articles of manufacture of claim 15, wherein the second tag identifies third-party results.

* * * * *